United States Patent
Harms (10) Patent No.: US 9,523,489 B1
(45) Date of Patent: Dec. 20, 2016

(54) GROW LIGHT COOLING SYSTEM

(71) Applicant: Aermist LLC, Las Vegas, NV (US)

(72) Inventor: Jonathan S. Harms, Las Vegas, NV (US)

(73) Assignee: Aermist LLC, Las Vegas, NV (US)

( * ) Notice: Subject to any disclaimer, the term of this patent is extended or adjusted under 35 U.S.C. 154(b) by 8 days.

(21) Appl. No.: 14/836,867

(22) Filed: Aug. 26, 2015

(51) Int. Cl.
*F21V 29/503* (2015.01)
*A01G 7/04* (2006.01)
*F21V 29/67* (2015.01)

(52) U.S. Cl.
CPC ............. *F21V 29/503* (2015.01); *A01G 7/045* (2013.01); *F21V 29/673* (2015.01); *F21V 29/677* (2015.01)

(58) Field of Classification Search
CPC .... F21V 29/503; F21V 29/673; F21V 29/677; A01G 7/045
USPC .............. 362/1, 96, 218, 234, 253, 294, 373
See application file for complete search history.

(56) References Cited

U.S. PATENT DOCUMENTS

| | | | |
|---|---|---|---|
| 7,651,256 B2 * | 1/2010 | Lee | F21V 33/0088 362/218 |
| 7,972,044 B2 * | 7/2011 | Burkhauser | A01G 9/26 362/218 |
| 8,651,704 B1 * | 2/2014 | Gordin | F21V 33/006 362/145 |
| 2002/0136028 A1 * | 9/2002 | Smith | G02B 6/0006 362/580 |

* cited by examiner

*Primary Examiner* — Laura Tso
(74) *Attorney, Agent, or Firm* — One3 IP Management, P.C.; Justin G. Sanders; Dean G. Stathakis (57) ABSTRACT

A grow light cooling system is disclosed for use within a grow facility. In at least one embodiment, the system provides an elongate enclosure having an at least one intake end and an at least one exhaust end, along with an at least one grow light suspended therewithin. The at least one intake end provides an intake fan configured for drawing air into said intake end. The at least one exhaust end provides an exhaust fan configured for expelling air from said exhaust end. A bottom surface of the enclosure provides an at least one cutout positioned substantially underneath each of the at least one grow light. The at least one grow light is positioned in substantially close proximity to the bottom surface of the enclosure, thereby causing airflow within the enclosure to form a relatively thin air curtain that flows across the at least one cutout.

20 Claims, 4 Drawing Sheets

GROW LIGHT COOLING SYSTEM

RELATED APPLICATIONS

Not applicable.

BACKGROUND

The subject of this patent application relates generally to indoor agriculture, and more particularly to a grow light cooling system configured for regulating the ambient heat generated by grow lights without reducing the effectiveness of the grow lights on the plants positioned thereunder.

Applicant(s) hereby incorporate herein by reference any and all patents and published patent applications cited or referred to in this application.

By way of background, a grow light is an artificial light source, generally an electric light, designed to stimulate plant growth by emitting an electromagnetic spectrum appropriate for photosynthesis. Grow lights are used in applications where there is either no naturally occurring light—such as indoor grow facilities—or where supplemental light is required—such as locations where the available hours of daylight may be insufficient for the desired plant growth. Grow lights either attempt to provide a light spectrum similar to that of the sun, or to provide a spectrum that is more tailored to the needs of the plants being cultivated. A plant's specific needs determine which lighting is most appropriate for optimum growth; artificial light must mimic the natural light to which the plant is best adapted. Outdoor conditions are mimicked with varying colors, temperatures and spectral outputs from the grow light, as well as varying the lumen output (intensity) of the lamps. Depending on the type of plant being cultivated, the stage of cultivation (e.g., the germination/vegetative phase or the flowering/fruiting phase), and the photoperiod required by the plants, specific ranges of spectrum, luminous efficacy and color temperature are desirable for use with specific plants and time periods.

According to the inverse-square law, the intensity of light radiating from a point source (such as a grow light) that reaches a surface is inversely proportional to the square of the surface's distance from the source. Accordingly, if an object is twice as far away from the light source, it receives only a quarter the light, which can be a serious issue for indoor growers. Many techniques are employed to use light as efficiently as possible, such as the use of reflectors. Plants or lights are also typically moved as close together as possible so that they receive equal lighting and so all light coming from the lights falls on the plants rather than on the surrounding area.

A range of bulb types can be used as grow lights, such as incandescents, fluorescent lights, high-intensity discharge lamps ("HID"), and light-emitting diodes ("LED"). Currently, the most widely used bulb types for professional use are HID and fluorescent bulbs. However, while these types of bulbs might be effective, they tend to produce a large amount of heat, with some capable of reaching 500 to 700 degrees Fahrenheit. Such temperatures have to potential to detrimentally affect certain types of plants.

In an attempt to reduce these heat issues, grow lights are sometimes positioned within air ducts or similar enclosures, which assists in containing at least some of the heat that is generated by the grow lights and preventing that heat from reaching the plants below. These enclosures typically provide a cutout positioned directly underneath each grow light, which allows the light to shine down and reach the plants below. Additionally, to better prevent the heat from escaping from the enclosure, a pane of glass (or other transparent or translucent material) is positioned within each cutout. However, while such materials may prove effective in preventing some or all of the heat from escaping from the enclosure, they also typically reduce the efficiency of the grow lights—essentially absorbing or otherwise preventing certain important components of the light, such as ultra-violet rays, from reaching the plants below. Another attempt to reduce these heat issues involves using a climate control system to regulate the temperature of the grow facility; however, depending on the size of the grow facility, such systems can become very expensive and cost-prohibitive. Thus, there remains a need for a cost-effective system that regulates the ambient heat generated by grow lights without reducing the effectiveness of the grow lights on the plants positioned thereunder.

Aspects of the present invention fulfill these needs and provide further related advantages as described in the following summary.

SUMMARY

Aspects of the present invention teach certain benefits in construction and use which give rise to the exemplary advantages described below.

The present invention solves the problems described above by providing a grow light cooling system for use in a grow facility. In at least one embodiment, the system provides an elongate enclosure having an at least one intake end and an at least one exhaust end, along with an at least one grow light suspended therewithin. Each of the at least one intake end is in fluid communication with an at least one intake fan configured for drawing air into said intake end of the enclosure. Each of the at least one exhaust end is in fluid communication with an at least one exhaust fan configured for expelling air from said exhaust end of the enclosure. Thus, the at least one intake fan and exhaust fan cooperate to create an amount of airflow through the enclosure. A bottom surface of the enclosure provides an at least one cutout positioned substantially underneath each of the at least one grow light. The at least one grow light is positioned in substantially close proximity to the bottom surface of the enclosure, thereby causing the airflow to form a relatively thin air curtain that flows across the at least one cutout, substantially between the at least one grow light and the bottom surface of the enclosure, and assists in substantially preventing at least a portion of the heat emitted by the at least one grow light from escaping through the corresponding at least one cutout. Thus, the system is capable of regulating the ambient heat generated by the at least one grow light without reducing the effectiveness of the at least one grow light on the plants positioned thereunder.

Other features and advantages of aspects of the present invention will become apparent from the following more detailed description, taken in conjunction with the accompanying drawings, which illustrate, by way of example, the principles of aspects of the invention.

BRIEF DESCRIPTION OF THE DRAWINGS

The accompanying drawings illustrate aspects of the present invention. In such drawings.

The above described drawing figures illustrate aspects of the invention in at least one of its exemplary embodiments, which are further defined in detail in the following description. Features, elements, and aspects of the invention that are referenced by the same numerals in different figures represent the same, equivalent, or similar features, elements, or aspects, in accordance with one or more embodiments.

DETAILED DESCRIPTION

Figures 1, 2:
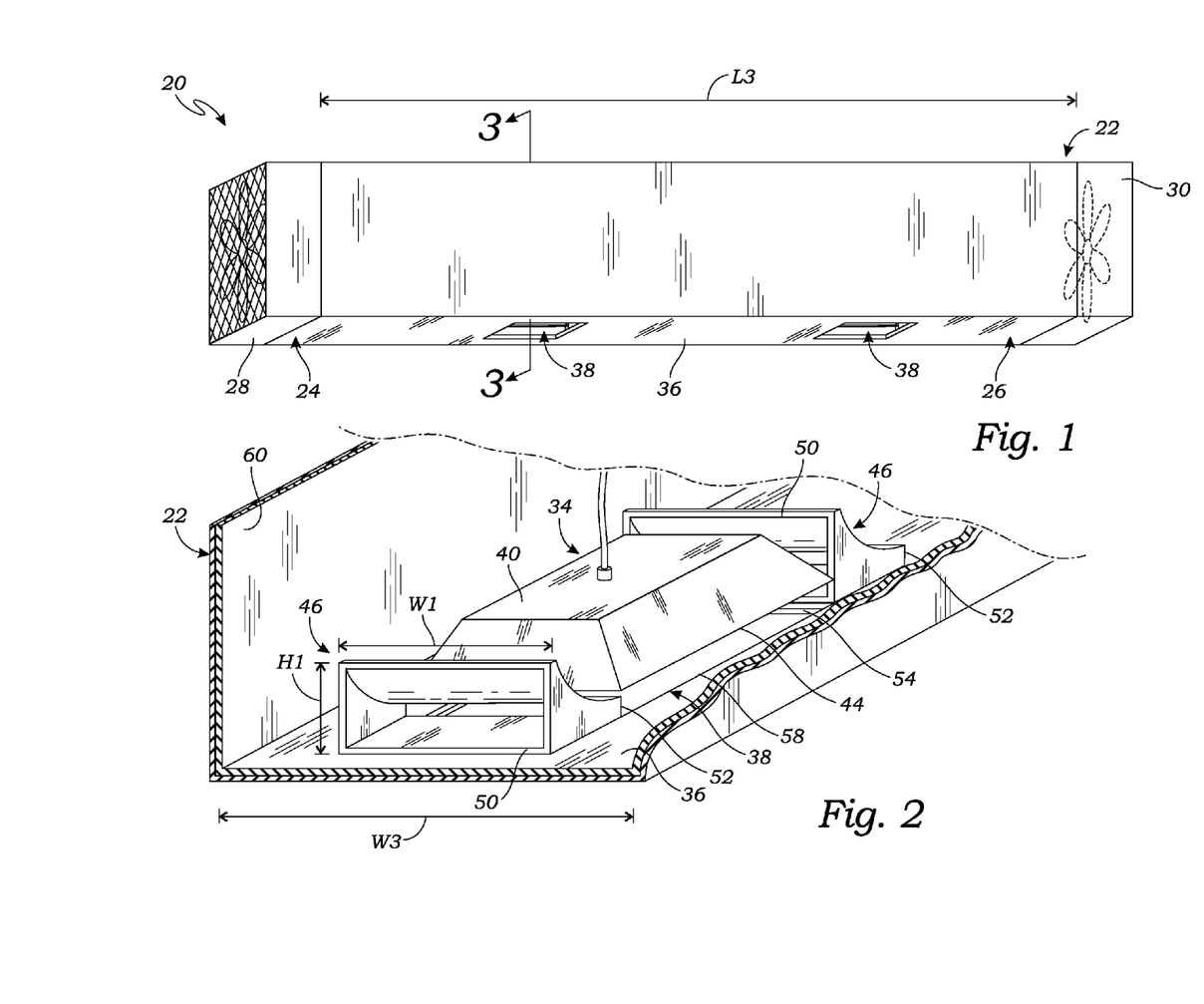
FIG. 1 is a perspective view of an exemplary grow light cooling system, in accordance with at least one embodiment.
FIG. 2 is a partial perspective view thereof, with a portion of an enclosure of the system cut away for clarity purposes, in accordance with at least one embodiment.

Turning now to FIG. 1, there is shown a perspective view of an exemplary embodiment of a grow light cooling system 20. In at least one embodiment, the system 20 provides an elongate enclosure 22 having an at least one intake end 24 and an at least one exhaust end 26; the enclosure defining an at least one airflow channel 62 therewithin, extending between the at least one intake end 24 and the at least one exhaust end 26. Each of the at least one intake end 24 is in fluid communication with an at least one intake fan 28 configured for drawing air into the at least one intake end 24 of the enclosure 22, while each of the at least one exhaust end 26 is in fluid communication with an at least one exhaust fan 30 configured for expelling air from the at least one exhaust end 26 of the enclosure 22. Accordingly, the intake fan 28 and exhaust fan 30 cooperate to move air through the length of the enclosure 22, thereby creating an amount of airflow 32 therethrough. In at least one embodiment, the enclosure 22 is positioned within a grow facility or other structure (hereinafter generally referred to as a "grow facility" for simplicity purposes), with the intake fan 28 positioned for drawing in air from outside of the grow facility and the exhaust fan 30 positioned for expelling air outside of the grow facility so as to assist in reducing the ambient temperature of the grow facility. For clarity purposes, the grow facility is not shown in the accompanying drawings. In at least one embodiment, the enclosure 22 is constructed of metal, similar to that of a traditional air duct; however, in further embodiments, the enclosure 22 may be constructed of any other material (or combination of materials), now known or later developed, capable of allowing the system 20 to substantially carry out the functionality described herein. It should also be noted that while the enclosure 22 is shown in the drawings as being substantially rectangular in shape, in further embodiments, the enclosure 22 may take on any other size, shape and/or dimensions now known or later conceived—dependent, at least in part, on the location and context in which the system 20 is to be installed and utilized.

Figure 3:
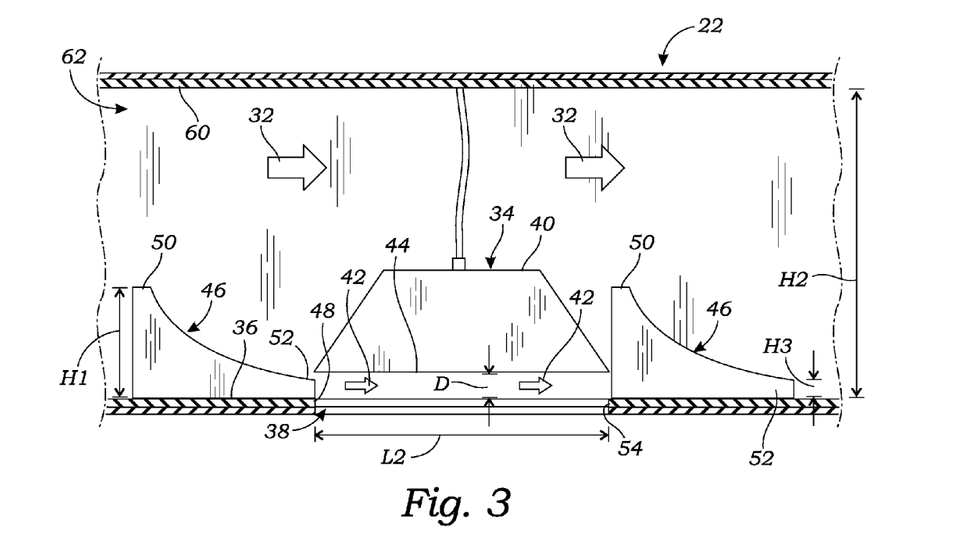
FIG. 3 is a partial cross-sectional view taken along line 3-3 of FIG. 1, in accordance with at least one embodiment.

In at least one embodiment, as best shown in FIGS. 1-3, the enclosure 22 provides an at least one grow light 34 suspended within the enclosure 22. Additionally, a bottom surface 36 of the enclosure 22 provides a cutout 38 positioned substantially underneath each of the at least one grow light 34, thereby allowing the light emitted by the grow light 34 to shine down and reach an at least one plant (not shown) positioned substantially below the enclosure 22. In at least one embodiment, the at least one grow light 34 provides a hood 40 that assists in directing the light emitted by the grow light 34 substantially downward, through the corresponding cutout 38, toward the plants. In at least one embodiment, the shape and dimensions of each cutout 38 approximate the shape and dimensions of the corresponding hood 40 suspended thereabove. It should be noted that while the hoods 40 and cutouts 38 are shown in the drawings as being substantially rectangular in shape, in further embodiments, the hoods 40 and cutouts 38 may take on any other size, shape and/or dimensions now known or later conceived—dependent, at least in part, on the location and context in which the system 20 is to be installed and utilized, as well as the type of grow lights 34 positioned within the enclosure 22.

In at least one embodiment, as illustrated best in FIGS. 2 and 3, the at least one grow light 34 is positioned in substantially close proximity to the bottom surface 36 of the enclosure 22. With each grow light 34 so positioned, the airflow 32 (FIG. 3) passing through the enclosure—by virtue of the intake and exhaust fans 28 and 30—forms a relatively thin air curtain 42 that flows across each cutout 38, substantially between the grow light 34 and the bottom surface 36 of the enclosure 22. As such, the air curtain 42 functions as an invisible barrier that assists in substantially preventing at least a portion of the heat emitted by the at least one grow light 34 from escaping through the corresponding cutout 38 of the enclosure 22. Instead, that heat is substantially retained within the enclosure 22 and expelled via the exhaust fan 30; thereby reducing the ambient temperature both within the enclosure 22 as well as the grow facility in which the enclosure 22 is positioned. Additionally, since the air curtain 42 is nothing more than air, the efficiency of the at least one grow light 34 upon the plants positioned therebelow is substantially unaffected, as the light is able to pass freely through the corresponding cutout 38 of the enclosure 22. In at least one such embodiment, the at least one grow light 34 is positioned such that a distance D between a bottom edge 44 of the grow light 34 and the bottom surface 36 of the enclosure 22 is between one-sixteenth of an inch (¹⁄₁₆") and two inches (2"). However, in further embodiments, the distance D between the bottom edge 44 of the grow light 34 and the bottom surface 36 of the enclosure 22 may be any other desired distance—dependent, at least in part, on the location and context in which the system 20 is to be installed and utilized, as well as the type of grow lights 34 positioned within the enclosure 22.

With continued reference to FIGS. 2 and 3, in at least one embodiment, the enclosure 22 provides an at least one open-ended air scoop 46 positioned adjacent a leading edge 48 of each cutout 38 (i.e., the edge of the cutout 38 that faces into the direction of the airflow 32 within the enclosure 22) and configured for assisting in directing the airflow 32 and forming the air curtain 42 across the cutout 38. In at least one such embodiment, a first end 50 of the air scoop 46 is relatively larger than an opposing second end 52 of the air scoop 46, with the second end 52 being positioned adjacent the leading edge 48 of the cutout 38 and the first end 50 facing into the direction of the airflow 32 within the enclosure 22. In this way, the relatively larger first end 50 of the air scoop 46 is able to capture a relatively greater amount of the airflow 32 within the enclosure 22, which is then forced through the relatively smaller second end 52 of the air scoop 46, such that the airflow 32 is accelerated as it passes over the cutout 38 in the form of the air curtain 42. This, in turn, increases the efficiency of the air curtain 42, allowing it to substantially prevent a relatively greater portion of the heat emitted by the at least one grow light 34 from escaping through the corresponding cutout 38 of the enclosure 22. In at least one embodiment, the enclosure 22 provides a further air scoop 46 positioned adjacent a trailing edge 54 of each cutout 38 (i.e., the edge of the cutout 38 that faces away from the direction of the airflow 32 within the enclosure 22) for assisting in maintaining the speed of the airflow 32 as it moves between cutouts 38 through the enclosure 22. In at least one such embodiment, the relatively larger first end 50 of the further air scoop 46 is positioned adjacent the trailing edge 54 of the cutout 38, with the relatively smaller second end 52 facing away from the direction of the airflow 32 within the enclosure 22. In at least one embodiment, the at least one air scoop 46 has a width W1 that substantially spans a width W2 of the cutout 38 to which the air scoop 46 is adjacently positioned. In at least one alternate embodiment, the width W1 of the at least one air scoop 46 substantially spans a width W3 of the enclosure 22. In at least one further alternate embodiment, the width of the first end 50 of the at least one air scoop 46 substantially spans the width W3 of the enclosure 22, while the width of the second end 52 substantially spans the width W2 of the cutout 38. In at least one embodiment, the first end 50 of the at least one air scoop 46 has a height H1 that is greater than the distance D between the bottom edge 44 of the grow light 34 and the bottom surface 36 of the enclosure 22. In at least one such embodiment, the height H1 of the first end 50 substantially spans a height H2 of the enclosure 22. In at least one embodiment, the second end 52 of the at least one air scoop 46 has a height H3 that substantially approximates the distance D between the bottom edge 44 of the grow light 34 and the bottom surface 36 of the enclosure 22. In still further embodiments, the at least one air scoop 46 may take on any other desired size, shape and/or dimensions, now known or later conceived—dependent, at least in part, on the location and context in which the system 20 is to be installed and utilized, as well as the type of grow lights 34 positioned within the enclosure 22.

Figure 4:
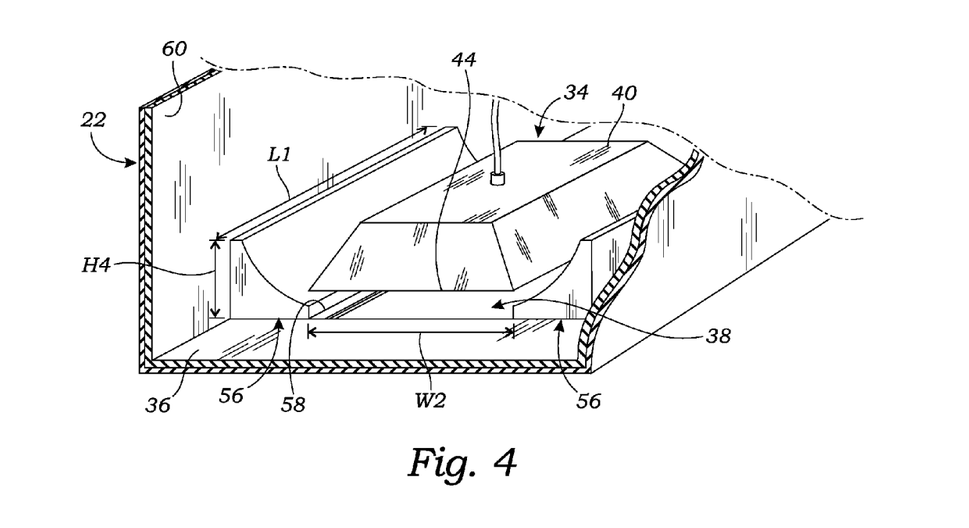
FIG. 4 is a partial perspective view of a further exemplary grow light cooling system, with a portion of an enclosure of the system cut away for clarity purposes, in accordance with at least one embodiment.

In at least one embodiment, as best shown in FIG. 4, the enclosure 22 provides a pair of laterally opposing sidewalls 56 that flank each cutout 38, the sidewalls 56 being positioned adjacent opposing lateral edges 58 of the cutout 38 and configured for assisting in directing the airflow 32 and forming the air curtain 42 across the cutout 38. In at least one such embodiment, the sidewalls 56 are substantially planar and extend substantially perpendicularly from the bottom surface 36 of the enclosure 22. In at least one alternate embodiment, as illustrated in FIG. 4, the sidewalls 56 are substantially curved. In at least one embodiment, the sidewalls 56 have a length L1 that substantially spans a length L2 of the cutout 38 to which the sidewalls 56 are adjacently positioned. In at least one alternate embodiment, the length L1 of the sidewalls 56 spans an entire length L3 of the enclosure 22. In at least one embodiment, the sidewalls 56 have a height H4 that is greater than the distance D between the bottom edge 44 of the grow light 34 and the bottom surface 36 of the enclosure 22. In at least one such embodiment, the height H4 of the sidewalls 56 substantially spans the height H2 of the enclosure 22. In at least one embodiment, as illustrated in FIG. 4, the sidewalls 56 are separate pieces that are either removably or permanently positioned within the enclosure 22. In at least one alternate embodiment, the sidewalls 56 are formed by selectively bending at least a portion of the lateral edges 58 of the at least one cutout 38. In at least one such alternate embodiment, the leading edge 48 and trailing edge 54 of the at least one cutout 38 are overcut a distance into the bottom surface 36 of the enclosure 22, thereby allowing the lateral edges 58 to be selectively bent upwardly or downwardly as desired. In still further embodiments, the sidewalls 56 may take on any other desired size, shape and/or dimensions, now known or later conceived—dependent, at least in part, on the location and context in which the system 20 is to be installed and utilized, as well as the type of grow lights 34 positioned within the enclosure 22. In at least one still further embodiment, the enclosure 22 utilizes a combination of both the air scoops 46 and the sidewalls 56.

With continued reference to FIGS. 2-4, in at least one embodiment, the enclosure 22 is lined internally with a layer of insulation material 60 for assisting in retaining at least a portion of the heat emitted by the at least one grow light 34 within the enclosure 22. In at least one such embodiment, the entire enclosure 22 is lined internally with insulation material 60. In at least one alternate embodiment, the insulation material 60 is only positioned around each cutout 38.

Figure 5:
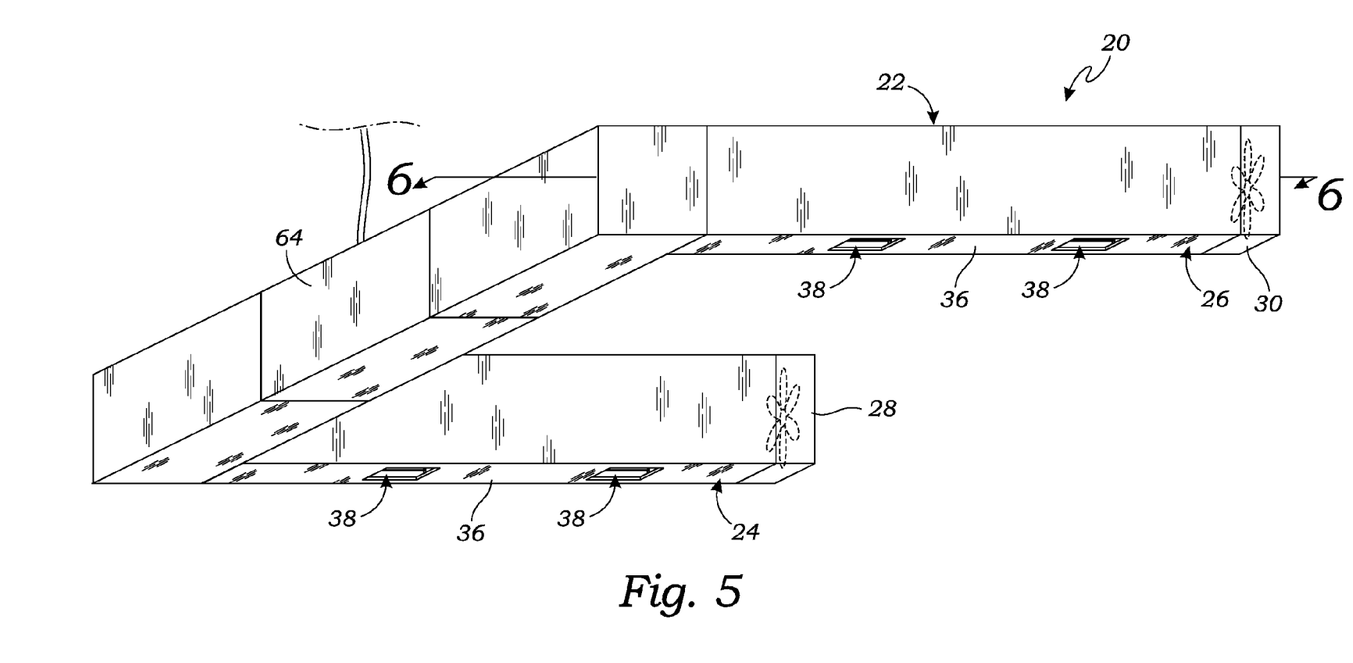
FIG. 5 is a perspective view of a still further exemplary grow light cooling system, in accordance with at least one embodiment.

In at least one embodiment, as illustrated in FIG. 1, the enclosure 22 is substantially linear in shape—typically where the enclosure 22 is to be positioned over a single row of plants (or a plurality of closely positioned rows of plants). However, in at least one further embodiment, as illustrated in FIG. 5, the enclosure 22 is non-linear in shape—typically where the enclosure 22 is to be positioned over multiple spaced apart rows of plants. Additionally, in at least one embodiment, the enclosure 22 defines a single airflow channel 62 (FIG. 3) therewithin, running in series and extending between the at least one intake end 24 and the at least one exhaust end 26. In at least one alternate embodiment, the enclosure 22 defines a plurality of airflow channels 62 therewithin, running in parallel. It should be noted that the particular sizes, shapes and dimensions of the enclosure 22 shown in the drawings are merely exemplary. In further embodiments, the enclosure 22 may take on any other size, shape and/or dimensions now known or later conceived—dependent, at least in part, on the location and context in which the system 20 is to be installed and utilized, as well as the type of grow lights 34 positioned within the enclosure 22.

Figure 6:
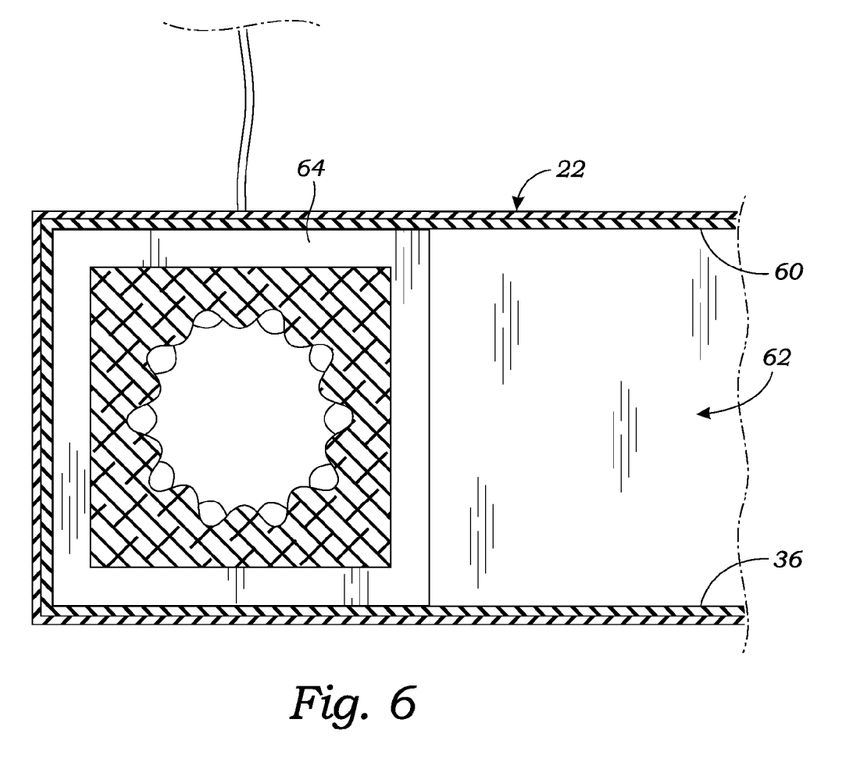
FIG. 6 is a partial cross-sectional view taken along line 6-6 of FIG. 5, in accordance with at least one embodiment.

In at least one embodiment, as shown best in FIGS. 5 and 6, the enclosure 22 provides an at least one air cooling unit 64 positioned in fluid communication with the at least one airflow channel 62 of the enclosure 22. The at least one air cooling unit 64 is configured for reducing the temperature of the airflow 32 as it moves from the at least one intake end 24 of the enclosure to the at least one exhaust end 26; thereby reducing the ambient temperature both within the enclosure 22 as well as the grow facility in which the enclosure 22 is positioned. In at least one embodiment, as shown in FIGS. 5 and 6, the at least one air cooling unit 64 is positioned in-line with the enclosure 22. In at least one alternate embodiment, the at least one air cooling unit 64 is positioned proximal the at least one intake fan 28. In still further embodiments, the at least one air cooling unit 64 may be positioned anywhere else relative to the enclosure 22—dependent, at least in part, on the location and context in which the system 20 is to be installed and utilized, the size, shape and dimensions of the enclosure 22, and the type of grow lights 34 positioned within the enclosure 22. In at least one embodiment, the at least one air cooling unit 64 is an evaporative HVAC apparatus such as described in at least U.S. Patent Application Publication Nos. 2014/0208796 and 2015/0123294, the contents of which are hereby incorporated herein by reference. In still further embodiments, the at least one air cooling unit 64 may be any other type of device (or combination of devices)—now known or later developed—capable of allowing the system 20 to substantially carry out the functionality described herein.

Aspects of the present specification may also be described as follows:

1. A grow light cooling system for use within a grow facility, the system comprising: an elongate enclosure having an at least one intake end and an at least one exhaust end, the enclosure providing an at least one grow light suspended therewithin; each of the at least one intake end in fluid communication with an at least one intake fan configured for drawing air into said intake end of the enclosure, and each of the at least one exhaust end in fluid communication with an at least one exhaust fan configured for expelling air from said exhaust end of the enclosure, said intake fan and exhaust fan cooperating to create an amount of airflow through the enclosure; and a bottom surface of the enclosure providing an at least one cutout positioned substantially underneath each of the at least one grow light, the at least one grow light being positioned in substantially close proximity to the bottom surface of the enclosure, thereby causing the airflow to form a relatively thin air curtain that flows across the at least one cutout, substantially between the at least one grow light and the bottom surface of the enclosure, and assists in substantially preventing at least a portion of the heat emitted by the at least one grow light from escaping through the corresponding at least one cutout; whereby, the system is capable of regulating the ambient heat generated by the at least one grow light without reducing the effectiveness of the at least one grow light on the plants positioned thereunder.

2. The grow light cooling system according to embodiment 1, wherein the at least one intake fan is positioned for drawing in air from outside of the grow facility and the at least one exhaust fan is positioned for expelling air outside of the grow facility.

3. The grow light cooling system according to embodiments 1-2, wherein the enclosure is constructed of metal.

4. The grow light cooling system according to embodiments 1-3, wherein the at least one grow light is positioned such that a distance between a bottom edge of the grow light and the bottom surface of the enclosure is between one-sixteenth of an inch and two inches.

5. The grow light cooling system according to embodiments 1-4, further comprising an at least one open-ended air scoop positioned adjacent a leading edge of each of the at least one cutout and configured for assisting in directing the airflow and forming the air curtain across the at least one cutout, a first end of the air scoop being relatively larger than an opposing second end of the air scoop.

6. The grow light cooling system according to embodiments 1-5, wherein the second end of the air scoop is positioned adjacent the leading edge of each of the at least one cutout and the first end of the air scoop faces into the direction of the airflow within the enclosure.

7. The grow light cooling system according to embodiments 1-6, further comprising a further air scoop positioned adjacent a trailing edge of each of the at least one cutout for assisting in maintaining the speed of the airflow as it moves through the enclosure.

8. The grow light cooling system according to embodiments 1-7, wherein the first end of the further air scoop is positioned adjacent the trailing edge of each of the at least one cutout and the second end of the further air scoop faces away from the direction of the airflow within the enclosure.

9. The grow light cooling system according to embodiments 1-8, wherein the at least one air scoop has a width that substantially spans a width of the at least one cutout to which the air scoop is adjacently positioned.

10. The grow light cooling system according to embodiments 1-9, wherein the at least one air scoop has a width that substantially spans a width of the enclosure.

11. The grow light cooling system according to embodiments 1-10, wherein: the first end of the at least one air scoop has a width that substantially spans a width of the enclosure; and the second end of the at least one air scoop has a width that substantially spans a width of the at least one cutout to which the air scoop is adjacently positioned.

12. The grow light cooling system according to embodiments 1-11, wherein the first end of the at least one air scoop has a height that is greater than a distance between a bottom edge of the grow light and the bottom surface of the enclosure.

13. The grow light cooling system according to embodiments 1-12, wherein the height of the first end substantially spans a height of the enclosure.

14. The grow light cooling system according to embodiments 1-13, wherein the second end of the at least one air scoop has a height that substantially approximates a distance between a bottom edge of the grow light and the bottom surface of the enclosure.

15. The grow light cooling system according to embodiments 1-14, further comprising a pair of laterally opposing sidewalls that flank each of the at least one cutout, the sidewalls being positioned adjacent opposing lateral edges of the at least one cutout and configured for assisting in directing the airflow and forming the air curtain across the at least one cutout.

16. The grow light cooling system according to embodiments 1-15, wherein the sidewalls are substantially planar and extend substantially perpendicularly from the bottom surface of the enclosure.

17. The grow light cooling system according to embodiments 1-16, wherein the sidewalls are substantially curved.

18. The grow light cooling system according to embodiments 1-17, wherein the sidewalls have a length that substantially spans a length of the at least one cutout to which the sidewalls are adjacently positioned.

19. The grow light cooling system according to embodiments 1-18, wherein the sidewalls have a length that substantially spans a length of the enclosure.

20. The grow light cooling system according to embodiments 1-19, wherein the sidewalls have a height that is greater than a distance between a bottom edge of the grow light and the bottom surface of the enclosure.

21. The grow light cooling system according to embodiments 1-20, wherein the sidewalls have a height that substantially spans a height of the enclosure.

22. The grow light cooling system according to embodiments 1-21, wherein the enclosure is lined internally with a layer of insulation material.

23. The grow light cooling system according to embodiments 1-22, wherein the at least one grow light provides a hood that assists in directing light emitted by the grow light substantially downward through the at least one cutout.

24. The grow light cooling system according to embodiments 1-23, wherein the enclosure provides a single airflow channel running in series and extending between the at least one intake end and the at least one exhaust end.

25. The grow light cooling system according to embodiments 1-24, wherein the enclosure provides a plurality of airflow channels running in parallel and extending between the at least one intake end and the at least one exhaust end.

26. The grow light cooling system according to embodiments 1-25, further comprising an at least one air cooling unit positioned in fluid communication with the enclosure.

27. The grow light cooling system according to embodiments 1-26, wherein the at least one air cooling unit is positioned in-line with the enclosure.

28. The grow light cooling system according to embodiments 1-27, wherein the at least one air cooling unit is positioned proximal the at least one intake fan.

29. A grow light cooling system for use within a grow facility, the system comprising: an elongate enclosure having an at least one intake end and an at least one exhaust end, the enclosure providing an at least one grow light suspended therewithin; each of the at least one intake end in fluid communication with an at least one intake fan configured for drawing air into said intake end of the enclosure, and each of the at least one exhaust end in fluid communication with an at least one exhaust fan configured for expelling air from said exhaust end of the enclosure, said intake fan and exhaust fan cooperating to create an amount of airflow through the enclosure; a bottom surface of the enclosure providing an at least one cutout positioned substantially underneath each of the at least one grow light, the at least one grow light being positioned in substantially close proximity to the bottom surface of the enclosure, thereby causing the airflow to form a relatively thin air curtain that flows across the at least one cutout, substantially between the at least one grow light and the bottom surface of the enclosure, and assists in substantially preventing at least a portion of the heat emitted by the at least one grow light from escaping through the corresponding at least one cutout; and an at least one open-ended air scoop positioned adjacent a leading edge of each of the at least one cutout and configured for assisting in directing the airflow and forming the air curtain across the at least one cutout; whereby, the system is capable of regulating the ambient heat generated by the at least one grow light without reducing the effectiveness of the at least one grow light on the plants positioned thereunder.

30. A grow light cooling system for use within a grow facility, the system comprising: an elongate enclosure having an at least one intake end and an at least one exhaust end, the enclosure providing an at least one grow light suspended therewithin; each of the at least one intake end in fluid communication with an at least one intake fan configured for drawing air into said intake end of the enclosure, and each of the at least one exhaust end in fluid communication with an at least one exhaust fan configured for expelling air from said exhaust end of the enclosure, said intake fan and exhaust fan cooperating to create an amount of airflow through the enclosure; a bottom surface of the enclosure providing an at least one cutout positioned substantially underneath each of the at least one grow light, the at least one grow light being positioned in substantially close proximity to the bottom surface of the enclosure, thereby causing the airflow to form a relatively thin air curtain that flows across the at least one cutout, substantially between the at least one grow light and the bottom surface of the enclosure, and assists in substantially preventing at least a portion of the heat emitted by the at least one grow light from escaping through the corresponding at least one cutout; an at least one open-ended air scoop positioned adjacent a leading edge of each of the at least one cutout and configured for assisting in directing the airflow and forming the air curtain across the at least one cutout; and a further air scoop positioned adjacent a trailing edge of each of the at least one cutout for assisting in maintaining the speed of the airflow as it moves through the enclosure; whereby, the system is capable of regulating the ambient heat generated by the at least one grow light without reducing the effectiveness of the at least one grow light on the plants positioned thereunder.

In closing, regarding the exemplary embodiments of the present invention as shown and described herein, it will be appreciated that a grow light cooling system is disclosed and configured for regulating the ambient heat generated by grow lights without reducing the effectiveness of the grow lights on the plants positioned thereunder. Because the principles of the invention may be practiced in a number of configurations beyond those shown and described, it is to be understood that the invention is not in any way limited by the exemplary embodiments, but is generally directed to a grow light cooling system and is able to take numerous forms to do so without departing from the spirit and scope of the invention. It will also be appreciated by those skilled in the art that the present invention is not limited to the particular geometries and materials of construction disclosed, but may instead entail other functionally comparable structures or materials, now known or later developed, without departing from the spirit and scope of the invention. Furthermore, the various features of each of the above-described embodiments may be combined in any logical manner and are intended to be included within the scope of the present invention.

Groupings of alternative embodiments, elements, or steps of the present invention are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Unless otherwise indicated, all numbers expressing a characteristic, item, quantity, parameter, property, term, and so forth used in the present specification and claims are to be understood as being modified in all instances by the term "about." As used herein, the term "about" means that the characteristic, item, quantity, parameter, property, or term so qualified encompasses a range of plus or minus ten percent above and below the value of the stated characteristic, item, quantity, parameter, property, or term. Accordingly, unless indicated to the contrary, the numerical parameters set forth in the specification and attached claims are approximations that may vary. At the very least, and not as an attempt to limit the application of the doctrine of equivalents to the scope of the claims, each numerical indication should at least be construed in light of the number of reported significant digits and by applying ordinary rounding techniques. Notwithstanding that the numerical ranges and values setting forth the broad scope of the invention are approximations, the numerical ranges and values set forth in the specific examples are reported as precisely as possible. Any numerical range or value, however, inherently contains certain errors necessarily resulting from the standard deviation found in their respective testing measurements. Recitation of numerical ranges of values herein is merely intended to serve as a shorthand method of referring individually to each separate numerical value falling within the range. Unless otherwise indicated herein, each individual value of a numerical range is incorporated into the present specification as if it were individually recited herein.

The terms "a," "an," "the" and similar referents used in the context of describing the present invention (especially in the context of the following claims) are to be construed to cover both the singular and the plural, unless otherwise indicated herein or clearly contradicted by context. All methods described herein can be performed in any suitable order unless otherwise indicated herein or otherwise clearly contradicted by context. The use of any and all examples, or exemplary language (e.g., "such as") provided herein is intended merely to better illuminate the present invention and does not pose a limitation on the scope of the invention otherwise claimed. No language in the present specification should be construed as indicating any non-claimed element essential to the practice of the invention.

Specific embodiments disclosed herein may be further limited in the claims using consisting of or consisting essentially of language. When used in the claims, whether as filed or added per amendment, the transition term "consisting of" excludes any element, step, or ingredient not specified in the claims. The transition term "consisting essentially of" limits the scope of a claim to the specified materials or steps and those that do not materially affect the basic and novel characteristic(s). Embodiments of the present invention so claimed are inherently or expressly described and enabled herein.

While aspects of the invention have been described with reference to at least one exemplary embodiment, it is to be clearly understood by those skilled in the art that the invention is not limited thereto. Rather, the scope of the invention is to be interpreted only in conjunction with the appended claims and it is made clear, here, that the inventor(s) believe that the claimed subject matter is the invention.

What is claimed is:

1. A grow light cooling system for use within a grow facility, the system comprising:
    an elongate enclosure having an at least one intake end and an at least one exhaust end, the enclosure providing an at least one grow light suspended therewithin;
    each of the at least one intake end in fluid communication with an at least one intake fan configured for drawing air into said intake end of the enclosure, and each of the at least one exhaust end in fluid communication with an at least one exhaust fan configured for expelling air from said exhaust end of the enclosure, said intake fan and exhaust fan cooperating to create an amount of airflow through the enclosure; and
    a bottom surface of the enclosure providing an at least one cutout positioned substantially underneath each of the at least one grow light, the at least one grow light being positioned in substantially close proximity to the bottom surface of the enclosure, thereby causing the airflow to form a relatively thin air curtain that flows across the at least one cutout, substantially between the at least one grow light and the bottom surface of the enclosure, and assists in substantially preventing at least a portion of the heat emitted by the at least one grow light from escaping through the corresponding at least one cutout;
    whereby, the system is capable of regulating the ambient heat generated by the at least one grow light without reducing the effectiveness of the at least one grow light on the plants positioned thereunder.

2. The grow light cooling system of claim 1, wherein the at least one intake fan is positioned for drawing in air from outside of the grow facility and the at least one exhaust fan is positioned for expelling air outside of the grow facility.

3. The grow light cooling system of claim 1, wherein the at least one grow light is positioned such that a distance between a bottom edge of the grow light and the bottom surface of the enclosure is between one-sixteenth of an inch and two inches.

4. The grow light cooling system of claim 1, further comprising an at least one open-ended air scoop positioned adjacent a leading edge of each of the at least one cutout and configured for assisting in directing the airflow and forming the air curtain across the at least one cutout, a first end of the air scoop being relatively larger than an opposing second end of the air scoop.

5. The grow light cooling system of claim 4, wherein the second end of the air scoop is positioned adjacent the leading edge of each of the at least one cutout and the first end of the air scoop faces into the direction of the airflow within the enclosure.

6. The grow light cooling system of claim 5, further comprising a further air scoop positioned adjacent a trailing edge of each of the at least one cutout for assisting in maintaining the speed of the airflow as it moves through the enclosure.

7. The grow light cooling system of claim 6, wherein the first end of the further air scoop is positioned adjacent the trailing edge of each of the at least one cutout and the second end of the further air scoop faces away from the direction of the airflow within the enclosure.

8. The grow light cooling system of claim 7, wherein the at least one air scoop has a width that substantially spans a width of the at least one cutout to which the air scoop is adjacently positioned.

9. The grow light cooling system of claim 7, wherein the at least one air scoop has a width that substantially spans a width of the enclosure.

10. The grow light cooling system of claim 7, wherein:
    the first end of the at least one air scoop has a width that substantially spans a width of the enclosure; and
    the second end of the at least one air scoop has a width that substantially spans a width of the at least one cutout to which the air scoop is adjacently positioned.

11. The grow light cooling system of claim 7, wherein the first end of the at least one air scoop has a height that is greater than a distance between a bottom edge of the grow light and the bottom surface of the enclosure.

12. The grow light cooling system of claim 7, wherein the second end of the at least one air scoop has a height that substantially approximates a distance between a bottom edge of the grow light and the bottom surface of the enclosure.

13. The grow light cooling system of claim 1, further comprising a pair of laterally opposing sidewalls that flank each of the at least one cutout, the sidewalls being positioned adjacent opposing lateral edges of the at least one cutout and configured for assisting in directing the airflow and forming the air curtain across the at least one cutout.

14. The grow light cooling system of claim 1, wherein the at least one grow light provides a hood that assists in directing light emitted by the grow light substantially downward through the at least one cutout.

15. The grow light cooling system of claim 1, wherein the enclosure is lined internally with a layer of insulation material.

16. The grow light cooling system of claim 1, wherein the enclosure provides a single airflow channel running in series and extending between the at least one intake end and the at least one exhaust end.

17. The grow light cooling system of claim 1, wherein the enclosure provides a plurality of airflow channels running in parallel and extending between the at least one intake end and the at least one exhaust end.

18. The grow light cooling system of claim 1, further comprising an at least one air cooling unit positioned in fluid communication with the enclosure.

19. A grow light cooling system for use within a grow facility, the system comprising:

an elongate enclosure having an at least one intake end and an at least one exhaust end, the enclosure providing an at least one grow light suspended therewithin;

each of the at least one intake end in fluid communication with an at least one intake fan configured for drawing air into said intake end of the enclosure, and each of the at least one exhaust end in fluid communication with an at least one exhaust fan configured for expelling air from said exhaust end of the enclosure, said intake fan and exhaust fan cooperating to create an amount of airflow through the enclosure;

a bottom surface of the enclosure providing an at least one cutout positioned substantially underneath each of the at least one grow light, the at least one grow light being positioned in substantially close proximity to the bottom surface of the enclosure, thereby causing the airflow to form a relatively thin air curtain that flows across the at least one cutout, substantially between the at least one grow light and the bottom surface of the enclosure, and assists in substantially preventing at least a portion of the heat emitted by the at least one grow light from escaping through the corresponding at least one cutout; and an at least one open-ended air scoop positioned adjacent a leading edge of each of the at least one cutout and configured for assisting in directing the airflow and forming the air curtain across the at least one cutout;

whereby, the system is capable of regulating the ambient heat generated by the at least one grow light without reducing the effectiveness of the at least one grow light on the plants positioned thereunder.

20. A grow light cooling system for use within a grow facility, the system comprising:

an elongate enclosure having an at least one intake end and an at least one exhaust end, the enclosure providing an at least one grow light suspended therewithin;

each of the at least one intake end in fluid communication with an at least one intake fan configured for drawing air into said intake end of the enclosure, and each of the at least one exhaust end in fluid communication with an at least one exhaust fan configured for expelling air from said exhaust end of the enclosure, said intake fan and exhaust fan cooperating to create an amount of airflow through the enclosure;

a bottom surface of the enclosure providing an at least one cutout positioned substantially underneath each of the at least one grow light, the at least one grow light being positioned in substantially close proximity to the bottom surface of the enclosure, thereby causing the airflow to form a relatively thin air curtain that flows across the at least one cutout, substantially between the at least one grow light and the bottom surface of the enclosure, and assists in substantially preventing at least a portion of the heat emitted by the at least one grow light from escaping through the corresponding at least one cutout;

an at least one open-ended air scoop positioned adjacent a leading edge of each of the at least one cutout and configured for assisting in directing the airflow and forming the air curtain across the at least one cutout; and a further air scoop positioned adjacent a trailing edge of each of the at least one cutout for assisting in maintaining the speed of the airflow as it moves through the enclosure;

whereby, the system is capable of regulating the ambient heat generated by the at least one grow light without reducing the effectiveness of the at least one grow light on the plants positioned thereunder.

\* \* \* \* \*